(12) United States Patent
Daniel

(10) Patent No.: US 9,584,991 B1
(45) Date of Patent: Feb. 28, 2017

(54) METHOD OF COMMUNICATING AND ACCESSING SOCIAL NETWORKS USING INTERACTIVE CODED MESSAGES

(71) Applicant: Isaac S. Daniel, Miramar, FL (US)

(72) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 14/744,554

(22) Filed: Jun. 19, 2015

Related U.S. Application Data

(60) Provisional application No. 62/014,222, filed on Jun. 19, 2014.

(51) Int. Cl.
| | |
|---|---|
| *H04M 1/00* | (2006.01) |
| *H04W 4/14* | (2009.01) |
| *H04L 12/58* | (2006.01) |
| *H04W 88/18* | (2009.01) |

(52) U.S. Cl.
CPC ............... *H04W 4/14* (2013.01); *H04L 51/32* (2013.01); *H04W 88/184* (2013.01)

(58) Field of Classification Search
CPC ............ H04W 8/245; H04M 1/72519; H04M 1/72522; G06F 3/04817
USPC ............ 455/550.1, 418, 466, 556.1; 715/769
See application file for complete search history.

(56) References Cited

U.S. PATENT DOCUMENTS

| | | | | |
|---|---|---|---|---|
| 8,676,273 | B1* | 3/2014 | Fujisaki | H04M 1/6505 379/142.06 |
| 2007/0036346 | A1* | 2/2007 | Kwon | G06F 3/0482 379/413 |
| 2008/0163074 | A1* | 7/2008 | Tu | G10L 13/08 715/758 |
| 2010/0214571 | A1* | 8/2010 | Luo | G06F 3/0486 358/1.1 |
| 2010/0227835 | A1* | 9/2010 | Christ | A61K 9/0073 514/53 |
| 2010/0306249 | A1* | 12/2010 | Hill | G06F 17/30867 707/769 |
| 2010/0323657 | A1* | 12/2010 | Barnard | H04W 4/02 455/404.1 |
| 2011/0047222 | A1* | 2/2011 | Farrell | G06Q 10/00 709/206 |
| 2014/0096083 | A1* | 4/2014 | Kim | G06F 3/04842 715/835 |
| 2014/0157167 | A1* | 6/2014 | Zhu | G06F 3/04817 715/769 |
| 2014/0181746 | A1* | 6/2014 | Lo | G06F 3/0488 715/835 |

* cited by examiner

*Primary Examiner* — Danh Le
(74) *Attorney, Agent, or Firm* — Carol N. Green Kaul, Esq.

(57) ABSTRACT

The present invention relates generally to a system and method of communicating cryptic text, i.e. private messages and accessing social networks using coded messages, wherein the system and method comprises activating privacy controls for intercepting electronic transmissions for controlling the display of the electronic transmissions on a mobile device; the determining of the presence of an indicator tag for incoming and/or outgoing decoded messages identifying messages for which there is a corresponding cryptic text; and for converting the at least one decoded message into cryptic text for displaying on the display, wherein the user may interact with the cryptic text via at least one icon, which are embedded with code configured to enable different user interactions with the cryptic text, wherein the embedded code may be executed by dragging the at least one icon to a code execution area of the display.

25 Claims, 16 Drawing Sheets

METHOD OF COMMUNICATING AND ACCESSING SOCIAL NETWORKS USING INTERACTIVE CODED MESSAGES

PRIORITY CLAIM

This patent application is a Non-Provisional patent application and claims priority under 35 U.S.C. §119(e) to U.S. Provisional Patent Application Ser. No. 62/014,222, titled "Method of Communicating and Accessing Social Networks Using Coded Messages" filed Jun. 19, 2014. The entire disclosure of the afore-mentioned patent application is incorporated by reference as if fully stated herein.

FIELD OF THE INVENTION

The present invention relates generally to a system and method of communicating cryptic text, i.e. private messages and accessing social networks using coded messages, wherein the system and method comprises activating privacy controls for intercepting electronic transmissions for controlling the display of the electronic transmissions on a mobile device; the determining of the presence of an indicator tag for incoming and/or outgoing decoded messages identifying messages for which there is a corresponding cryptic text; and for converting the at least one decoded message into cryptic text for displaying on the display, wherein the user may interact with the cryptic text via at least one icon, which are embedded with code configured to enable different user interactions with the cryptic text, wherein the embedded code may be executed by dragging the at least one icon to a code execution area of the display.

DESCRIPTION OF THE PRIOR ART

Although we are all aware of the dangers of driving and texting, a small minority still persists in engaging in this dangerous practice either out of perceived necessity or fear of missing an important call or message. Many states have cracked down on this practice enforcing traffic laws by issuing traffic tickets, but still the problem persists. Several mobile communicating devices, e.g. cellular phones, include voice activation options for dialing or answering calls, but not all phones include this option or not all users are fully conversant with this functionality. Notwithstanding, voice activation does not necessarily solve the underlying problem of trying to communicate a short message to callers in a quick, efficient and safe manner.

Individuals also face similar challenges in varied social settings where protocol dictates that phone conversations are kept to an absolute necessity, e.g. in a meeting or in attendance at a concert. Yet in an effort not to be discourteous, many call recipients choose to answer the phone and quickly acknowledge the caller even though they may not be able to engage in a full blown conversation. Thus, it would be useful to have a system and method of transmitting short coded messages in a quick and efficient manner to one or a plurality of recipients.

In instances where the call recipients choose not to answer the incoming call, generally there is intent to return the call in a timely manner. However, certain unanswered calls are soon forgotten and never returned. Thus, it would be useful to have a quick and efficient system and method of reminding the call recipient to return calls in an expedient manner.

This invention satisfies these long felt needs in a new and novel manner and solves the foregoing problems that the prior art has been unable to resolve.

SUMMARY OF THE INVENTION

An object of the present invention is to provide a system and method for transmitting coded messages using a wireless mobile device that overcomes the limitations of the prior art.

Another object of the present invention is to provide a system and method for sending short coded messages via mobile devices using pre-programmed and/or programmable keys.

Yet another object of the invention is to provide the means for users to customize a coded message for a particular message icon.

Another object of the invention is to provide the means for users to customize and edit the coded messages associated with particular icons.

Yet another object of the invention is to provide a system and method for correlating short coded messages with display icons which can be used to transmit at least one coded message to at least one or a plurality of message recipients.

Still yet another object of the invention is to allow users to customize the short coded messages being transmitted to communicate in a language of their choice.

Another object of the present invention is to provide a method wherein a user may selectively transmit at least one or more messages to one or a plurality of message recipients using any one or more of the pre-programmed or programmable keys.

Yet another object of the invention is to provide a calendaring system and method for incoming calls to remind call recipients of calendared events, which may include returning a phone call.

For a further and more fully detailed understanding of the present invention, various objects and advantages thereof, reference is made to the following detailed description and the accompanying drawings.

Additional objectives of the present invention will appear as the description proceeds. The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF PREFERRED EMBODIMENTS

Figure 1:
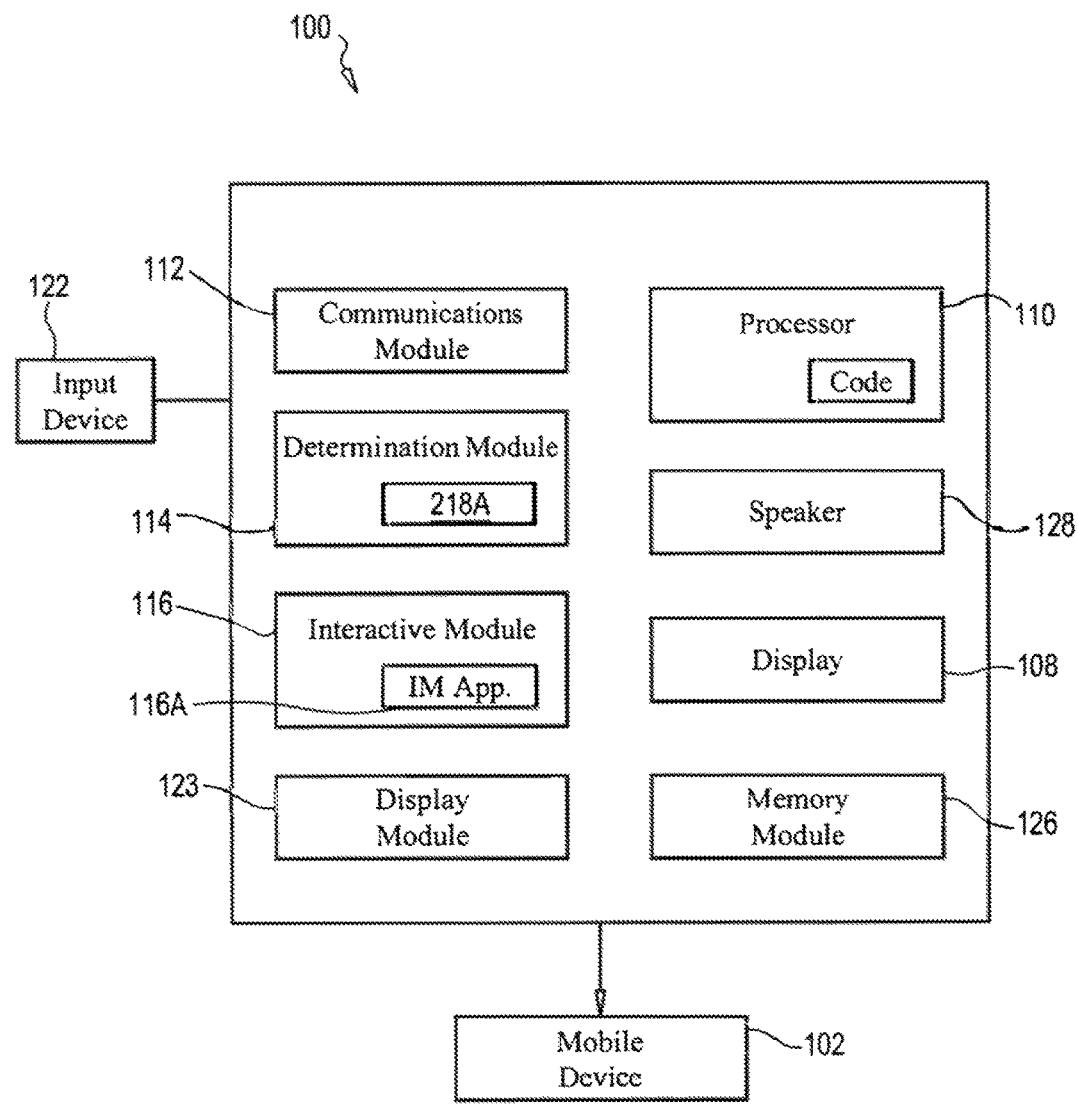
FIG. 1 shows an exemplary embodiment of the system according to one aspect of the invention.

The following discussion describes in detail an embodiment of the various methods for transmitting coded messages as described below. However, this discussion should not be construed, as limiting the invention to those particular embodiments, as practitioners skilled in the art will appreciate that an apparatus and system may vary as to configuration and as to details of the parts, and that a method may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Systems

FIG. 1 shows an exemplary embodiment of the system 100 according to one aspect of the invention. System comprises of a first mobile device 102 configured to display content, i.e. at least one or more messages 104 or cryptic text 106, on a display 108 of the mobile device 102; at least one processor 110 in communication with the mobile device 102; a communication module 112 in communication with the mobile device 102, wherein the communication module 112 is configured for: enabling communication between all of the system 100 modules; enabling communication between the mobile device 102 and a second and or a plurality of mobile device(s) 102; and activating privacy controls for intercepting electronic transmissions for controlling the display of the electronic transmissions on the mobile device 102; a determination module 114 in communication with the at least one processor 110, wherein the determination module 114 is configured for determining presence of an indicator tag for incoming and/or outgoing decoded messages identifying messages for which a corresponding cryptic text 106 exists; and for converting the at least one decoded message 104 into cryptic text 106 for display; and an interactive module 116 in communication with the at least one processor 110 wherein the interactive module 116 is configured to enable user interaction with the cryptic texts 114 via at least one icon 118, which are embedded with code configured to enable different user interactions with the cryptic text 106, and wherein the embedded code may be executed by dragging the at least one icon 118 to a code execution area of the display 108.

Display 108 may include any kind of displaying means, such as, but not limited to: a liquid crystal display ("LCD") screen, a light emitting diode ("LED") display, touchpad or touch screen display, and/or any other means known in the arts for emitting a visually perceptible output. Display 108 may be electrically or wirelessly connected to processor 110. In some embodiments, display 108 may include control means, such as, but not limited to, a touch screen, display screen, selecting using a pointing device, roller ball, arrow keys, a stylus or any other control means (input device 122) used in the arts. Processor 110 controls the mobile device's display 108, which is configured for displaying the converted icon's decoded message 104 on the at least one display 108; displaying confirmation of transmission of the decoded message 104; and/or displaying a link reference to the decoded message 104 as posted on the social network as well as all displayable information that are described herein.

In an aspect of an embodiment of the present invention, the term "module" may represent self-contained computer hardware and/or software. In another aspect of an embodiment of the present invention, the term "module" may represent computer hardware on a designated computer chip or separate computer chips. In yet another aspect of an embodiment of the present invention, the processor may be configured to perform tasks not undertaken by the module(s) disclosed herein. In a further aspect of an embodiment of the present invention, the modules may be hardware resident on one chip, component, separate components, a remote server, database, some or each of which (or all of which, in one aspect of an embodiment of the present invention) may be separate and distinct from the device, or any combination thereof. In one aspect of an embodiment of the present invention, a processor may be configured to coordinate, implement and/or assign tasks to, from and/or among the module(s). In a further aspect of an embodiment of the present invention, "module" may represent operational cooperation between system components. For instance, a display module 123 may comprise of the system processor, a display screen, memory, computer executable instructions executable by the processor and resident within memory location(s) etc. with each component being in communication with one or more other components in the module and each component working with the other component(s) to conduct the desired operation for which the module is configured to do e.g. display content within memory. In a further aspect of an embodiment of the present invention, module components may also, in an operational context, be components of other modules. For instance a processor in a display module 123 may also be engaged by an input module to help analyze data received via an input device 122.

In one aspect of an embodiment of the present invention, system 100 may be incorporated within a mobile device 102. System 100 is shown with processor 110, display 108, memory module 108, communication module 112, determination module 114, interactive module 116, which in one aspect of an embodiment of the present invention, may all be connected to processor 110. In another aspect of an embodiment of the present invention, only certain component(s) may be connected to processor 110.

Mobile device 102 may be any type of electronic computerized communication device configured with the ability to communicate wirelessly and/or wired with other mobile devices such as but not limited to, cellular phones (e.g., an iPhone, Android, Palm, Blackberry, or any "smart phone" as are generally known and used in the arts), location-aware portable phones (such as GPS), a personal computer, server computer, tablet, a wearable device, laptop or netbook computer, a personal digital assistant ("PDA") such as a Palm-based device or Windows CE device, a laptop computer, a tablet personal computer, a portable screen, a portable processing device and/or any other portable device capable of communicating wirelessly over a computer network, local area network, wide area network such as the Internet, or any other type of network device that may communicate over a network. "Computer" as used herein includes but is not limited to a network enabled computer, cellular phones like the mobile device 102 described herein, a laptop or personal digital assistant subject to wired/wireless connectivity, and configured with processor 110.

Processor 110 may be any type of processor, such as, but not limited to, a central processing unit (CPU), a microprocessor, a video processor, a front end processor, a coprocessor, a single-core central processor, a multi-core processor, and the like, as well as any known processor 110 that's used in the arts. Processor 110 may be programmed to activate the interactive module 116 by way of computer executable code (by way of interactive application 116A) running in background while mobile device 102 is powered on for controlling user's interaction with content. Processor 110 may be part of mobile device 102, part of a stationary device, such as server, or a combination of both. Processor 110 may include computer executable instructions 124 readable and executable by processor 110, which may be operative to perform all the necessary functions for the system 100 and methods disclosed herein that are required by the mobile device's hardware and software components. In one embodiment, the computer executable instructions 124 may be downloaded to and stored in memory module 108. Alternatively, the computer executable instructions 124 may be accessed via a mobile device 102, which may include accessing the computer executable instructions 124 over a network, such as, but not limited to, a wide area network or a local area network. In a further embodiment, the computer executable instructions 124 may be accessed on a website that is mobile device 102 accessible.

In some embodiments, the computer executable instructions or instructions 124 may operate on a mobile device 102, such as a mobile computer, or a mobile phone, while in other embodiments, the computer executable instructions 124 may operate on a stationary device, such as a personal computer or server. In some embodiments, the computer executable instructions 124 may be a mobile phone application (a mobile "app"). In some embodiments, server may reside at a remote location. In another embodiment, the computer executable instructions 124 may operate both on a mobile device and stationary device, and may include more than one set of computer executable instructions 102 located on a mobile device and/or a stationary device. In yet another embodiment, the computer executable instructions 124 may include computer executable instructions 124 on a mobile device 102 that work in conjunction with computer executable instructions 124 on a stationary device. In another embodiment, the computer executable instructions or instructions 124 may be readable by processor 110.

Computer executable instructions 124 may be loaded directly on the system's processor 110, or may be stored in the memory module 120 such as, computer readable media that includes but is not limited to, a hard drive, a solid state drive, a flash memory, random access memory, CD-ROM, CD-R, CD-RW, DVD-ROM, DVD-R, DVD-RW, and the like. Computer executable instruction 124 may be any type of computer executable instruction 124, which may be in the form of a computer program, the program being composed in any suitable programming language or source code, such as C++, C, JAVA, JavaScript, HTML, XML, and other programming languages.

System 100 comprises communication module 112 that may include but is not limited to, a radio frequency transceiver, a radio frequency receiver, and/or a radio frequency transmitter that is in communication with at least one processor 110. Processor 106 enables the communication module 112 for communicating between for example, the mobile device 102 and a second or a plurality of mobile device(s) 102; and for activating privacy controls for intercepting both incoming and outgoing electronic Short Message Service ("SMS") transmissions (text messages) for controlling the display of the SMS transmissions on the mobile device 102. Communication module 112 maintains the privacy of the electronic communications, transmitting the decoded message 104 to any one or more for the following: another mobile communication device 102' or the social network, where a receiving communication mobile of a second or a plurality of mobile device(s) 102 receives the transmitted decoded message 104'.

In some embodiments, communication module 112 may utilize different communication pathways/components to communicate with the various system modules and/or a second (and/or a plurality of) mobile device(s) 102, such as, but not limited to, a radio frequency transceiver, a radio frequency receiver, and/or a radio frequency transmitter. In embodiments where communication module 112 is a radio frequency transceiver, the radio frequency transceiver may be any type of radio frequency transceiver, including, but not limited to, a positioning system receiver, such as a global positioning system receiver and a local positioning system receiver, such as a Wi-Fi positioning system transceiver. In other embodiments, the communication module 112 may employ wireless protocols like Blue Tooth, ZigBee, 702.11 series, or a wireless modem, such as, but not limited to, a global system for mobile communications (GSM) modem, or any other short range wireless protocol that is well known and used in the arts and other future short range wireless protocol suitable for transmitting and receiving data. Communication module 112 may, in an aspect of an embodiment of the present invention, be operative to transmit or receive electronic communications, i.e. messages 104, 104', cryptic texts 106, and the like via a short range wireless protocol, such as, but not limited to, a radio frequency receiver, a radio frequency transmitter, or a radio frequency transceiver. Communication module 112 is configured for transmitting or receiving decoded messages 104, 104' to/from a second, a third, or more mobile device(s) 102 or even from a social network. Social network as used herein describes an online social construct of a community of people with common interests who use a website or other technologies to communicate with each other and share information, or resources.

System 100 may also include determination module 118 and determination module code 118. System 100, by way of communication module 112 may, in one aspect of an embodiment of the present invention, be in communication with one or a number of mobile device(s) 102. In a further aspect of an embodiment of the present system 100, the determination module 114 may include processor(s) 110 and computer executable code 124 stored in memory module 126 for analyzing incoming and outgoing transmissions for an indicator tag, thereby identifying messages 104 for which a corresponding cryptic text 106 to the decoded message 104 exists.

System 100 also includes an interactive module 116 that may comprise of the system processor 110, a display screen, memory, computer executable instructions 124 executable by the processor 110 and resident within system's memory location, e.g. memory module 126.

Interactive module 116 may be configured, by way of computer executable code (by way of interactive application 116A), to work or cause the display 108 to display an interactive screen on the display 108 to enable users to interact with content, i.e. icons 118, electronic SMS text messages 104, 104' and/or cryptic text 106.

In some embodiments, system 100 may include and/or may be in communication with one or more memory module(s) 126. In one aspect of an embodiment of the present invention, memory module(s) 126 may be either electrically or mechanically connected to computer processor 110. In the case of electronic connections, the electronic connections may be wired and/or wireless connections. Memory module(s) 126 may comprise of a storage device and may include memory, such as, but is not limited to, read-only memory, such as CD-ROMs, DVDs, floppy disks, and the like, read and write memory, such as a hard drive, floppy disc, CD-RW, DVD-RW, solid state memory, such as solid state hard drives, flash memory, and the like, and random access memory. The information stored thereon may be retrieved from memory module(s) 126 using the computer processor 110.

System 100 may further comprise at least one user input device 122 connected to processor 110. Input device 122 may comprise of a keyboard, a mouse, a button, a touch screen, a gesture control interface, and the like, where the user may use the input device 122 to interact with for example an icon 118 to control or interact with the cryptic text 106 and/or decoded messages 104 that is being displayed on display 108 for electronic transmissions to one or a plurality of recipients and/or posting on a social network. User may access one or a plurality of social networks that user has registered with the system 100, e.g. FACEBOOK®, TWITTER®, INSTAGRAM®, REEL CODE™ and the like. By registering the social networks, each registered social network's icon may be placed in a frame and the user may access and use the social network by accessing the social network's icon under the REEL CODE™ platform, using similar methodology of swiping the social network's icon to a code execution area 120 in the frame allowing the embedded code, i.e. a hyperlink to the social network site, access to the same.

System 100 may include a speaker 128 for publishing the decoded message(s) 104 or the various functions being performed herein in audio. Speaker 128 may be any kind of speaker that is well known and used in the arts for mobile devices.

Figure 2A:
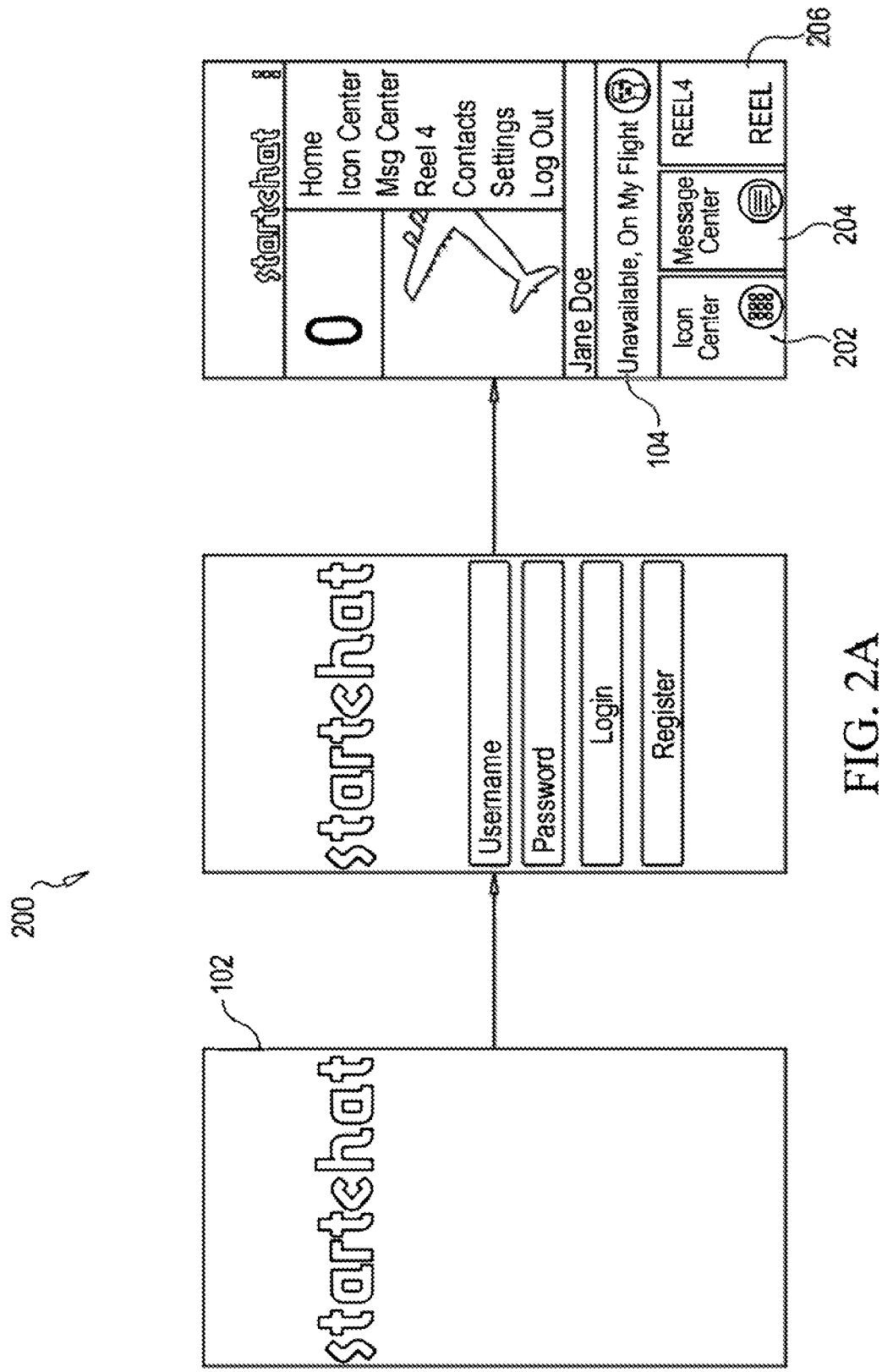
FIGS. 2A-2B show a system 200 in use according to an aspect of an embodiment of the present invention.
Figure 2B:
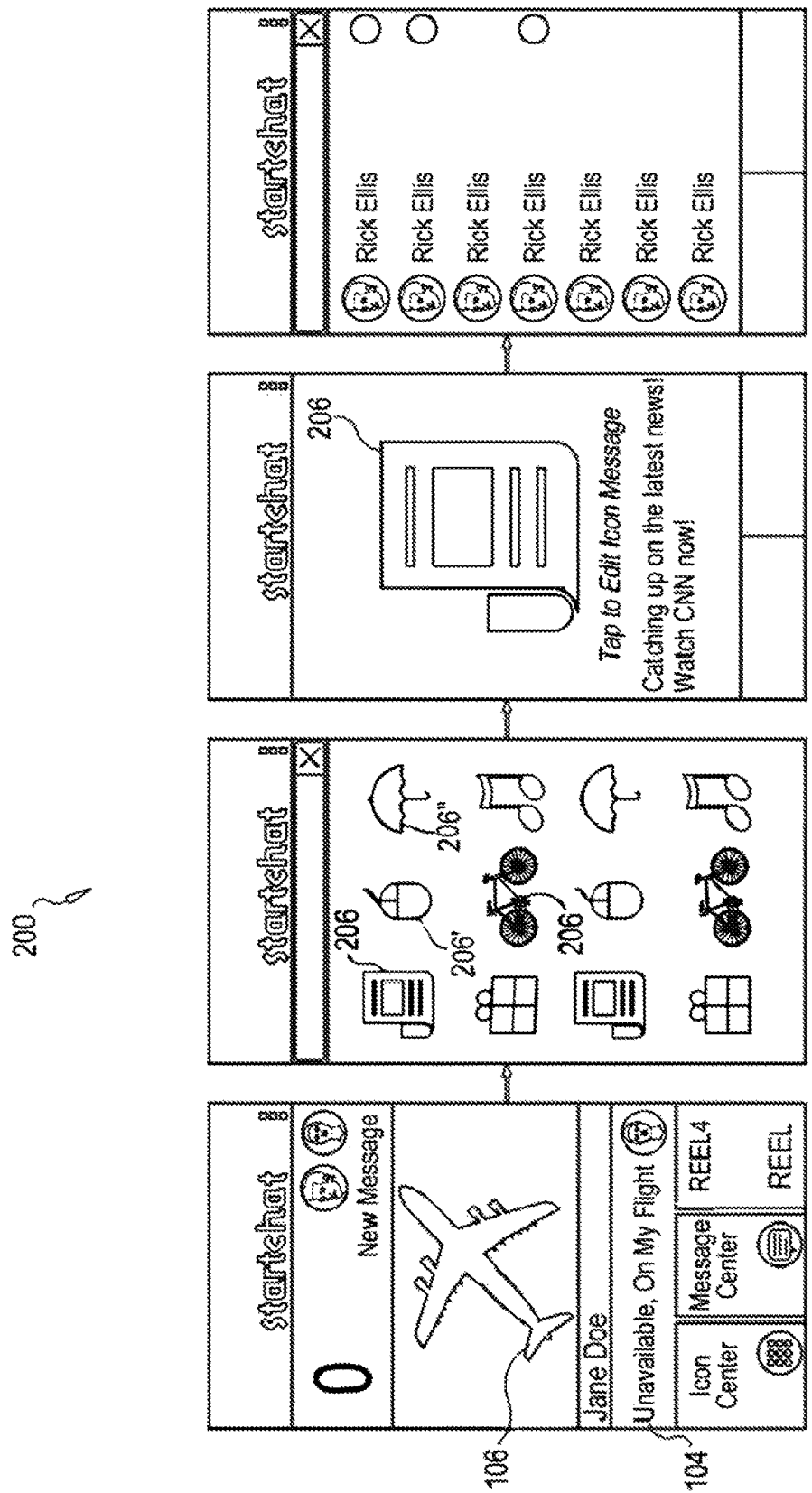

FIGS. 2A-2B show a system 200 in use according to an aspect of an embodiment of the present invention. System 200 includes an exemplary first mobile device 102, with means for communicating wirelessly and/or wired with a second, or a plurality of mobile devices 102".

Interactive module 116 which may be configured, by way of computer executable code (by way of interactive application 116A), to work or cause the display 108 to display an interactive screen on the display 108 to enable users to interact with icons 118, messages 104 and/or cryptic text 106. Processor 106 in communication with the interactive module 116 may be programmed to activate the interactive application 116A comprising of computer executable code to enable user interaction with the cryptic texts 106 via at least one icon 118, which are embedded with code configured to enable different user interactions with the cryptic text 104. As shown in FIG. 2A, interactive application 116A as shown may be activated for instance by engaging the application icon to gain access to the various functions described herein. Interactive application 116A having been activated operates with display 108 to display for instance Menu items, e.g. Login/Registration options such that privacy controls when activated can remain intact preventing unauthorized use and the system 100 can also properly attribute outgoing and incoming cryptic texts 106 to the proper author. User may also interact with the Menu items that may be accessed (via drop down menu) as presented to the user or by the user selecting panel 202, 204, 206 to select their desired Menu option.

FIG. 2B shows the activated interactive application 116A wherein the display 118 indicates that user has received "2 NEW MESSAGES," sender "JOHN SMITH" along with a text description of the meaning of the cryptic text 10. In so doing, user may engage a Menu Option for instance for "Icon Centre" where one or a plurality of available message icons 206, 206', 206" available for user selection is displayed. Interactive application 116A allows users to customize certain aspects of the displayed interactive application 116A, e.g. users may scroll and search for a particular message icon to create a responsive or new cryptic text 106 based on icon tags; edit the cryptic text 106 once one or more message icon 206 has been selected; review the meaning of the message icon to ensure it conforms with the intended message 104/cryptic text 106; and select from his/her contact list the one or more intended recipients for the cryptic text 106.

Figure 3A:
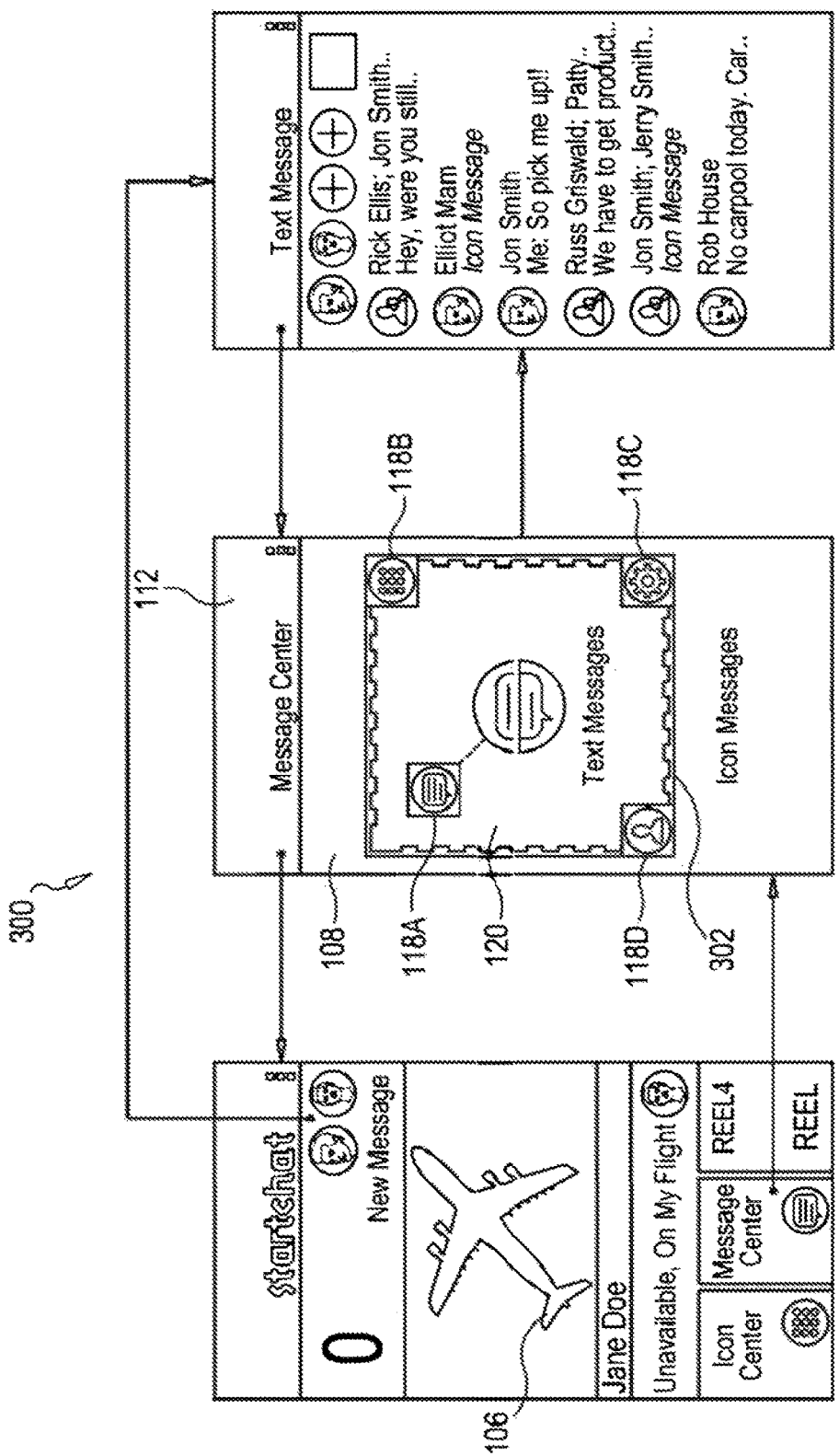
FIGS. 3A-3C show a system 200 in use according to an aspect of an embodiment of the present invention.
Figure 3B:
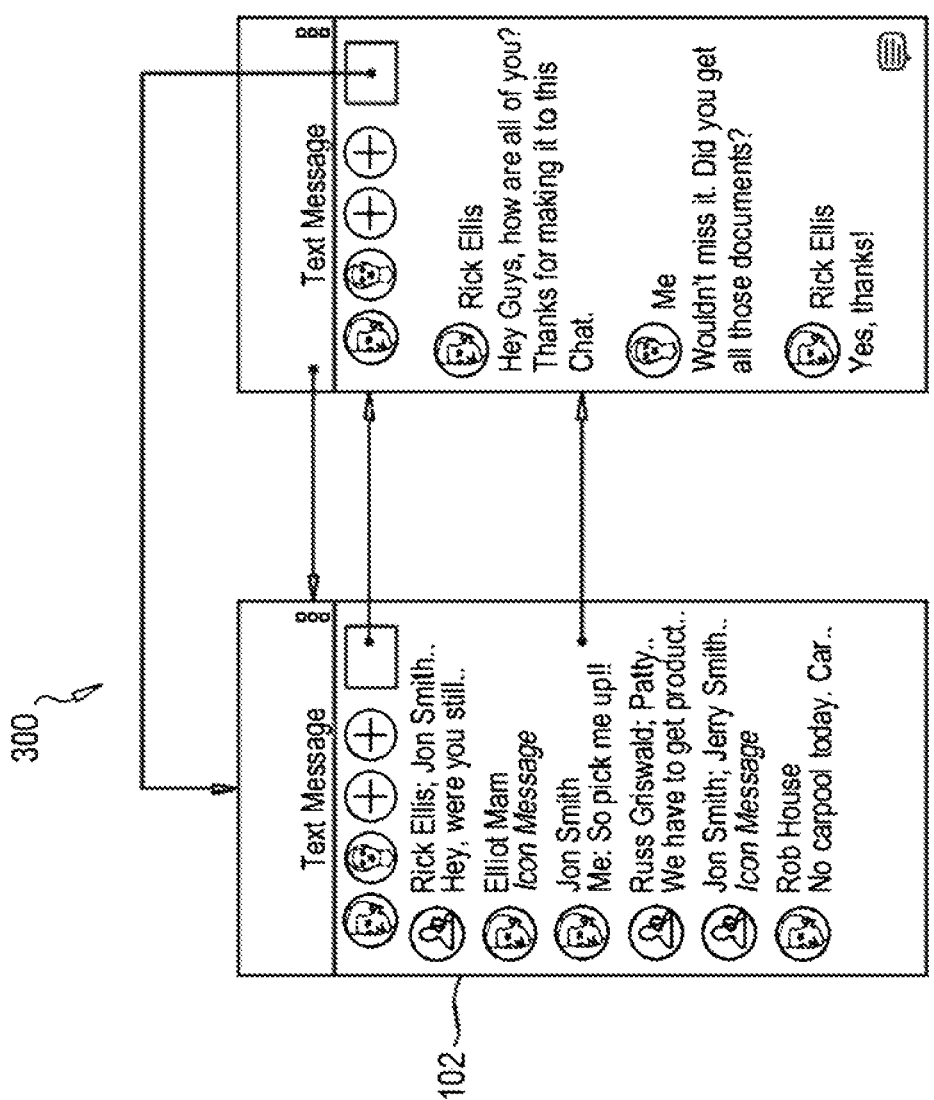
Figure 3C:
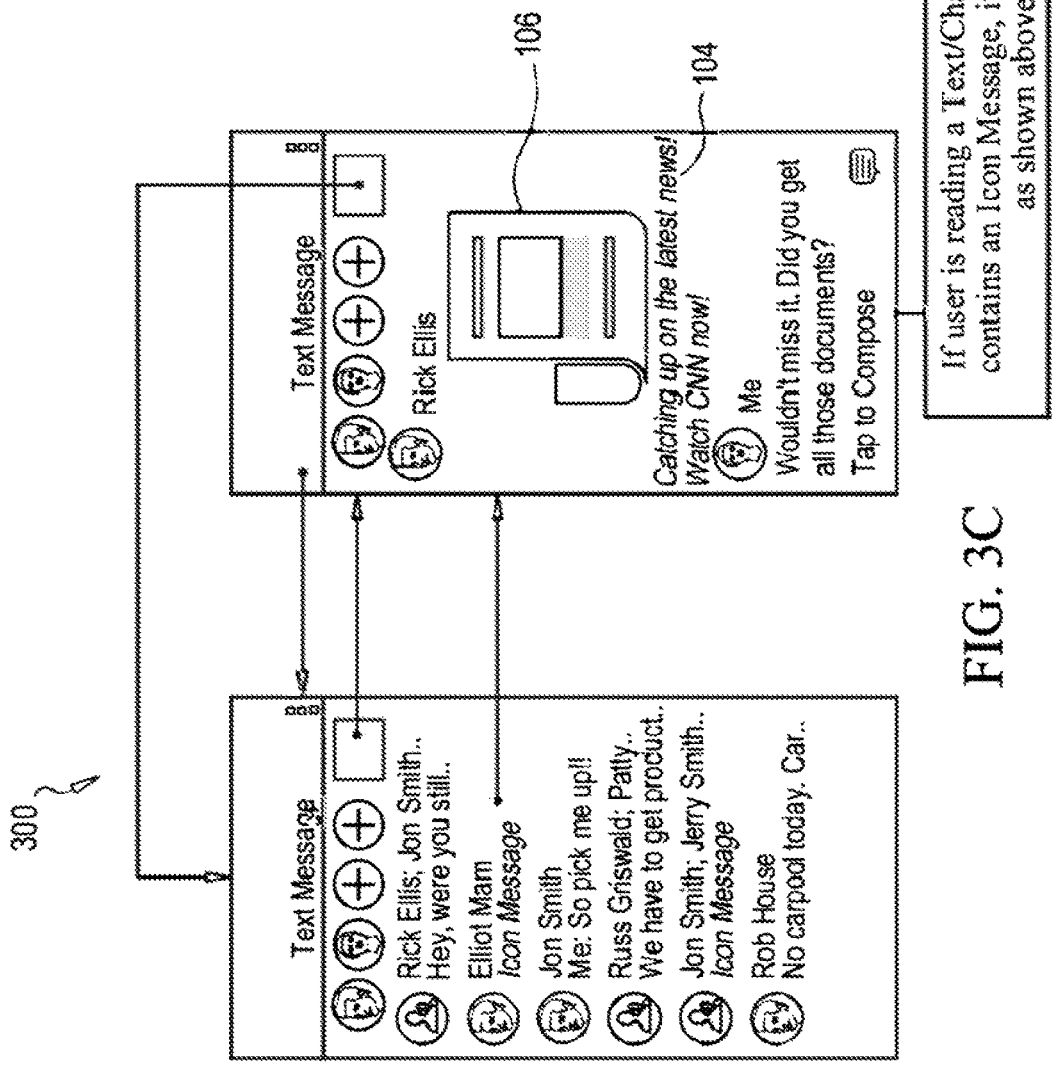

FIGS. 3A-3C show a system 300 in use according to an aspect of an embodiment of the present invention. Interactive application 116A, having been activated, operates with display 108 to display a display screen where the full array of icons 118A, 118B, 118C and 118D from a virtual keyboard or a list of available icons 118A, 118B, 118C and 118D that may be used for general use or to be selected for transmission of a cryptic text 106 comprising one or more message icons 206, 206' strung together for transmission to another user. It should be noted that icons or locations 118A, 118B, 118C and 118D could be of various numbers (as the number shown here is illustrative only) and may be located at different locations on the coded frame 302. Display 108 is also shown with a code activation area 120 for activating code that is embedded within icons 118A, 118B, 118C and 118D. For example, icon 118A may represent displaying the threads of current text/chat session on a social network. As such, the user, would drag icon 118A to code activation area 120 and the embedded code within is activated and the user is taken to a hyperlink (which may, in one aspect of an embodiment of the present invention is the embedded code in 118A) or directly to the social network where the user may then view the current text/chat session. The user may then access their social network which is framed within display 108. The layout of the selected social network is taken from the actual social network source being accessed and displayed as their mobile application version is intended. Interactive application 116A's frame (display module 123) surrounds and encases the social network feed.

Within the interactive app 116 user may also create a new text/chat thread by tapping a radio button, e.g. "+" button, select one or more contacts to text (via a pop up selector) and then tapping other radio buttons to activate a new chat session. User also has the ability to delete any thread of text session by long tapping a thread to trigger deletion of the pop up. Icons 118A-D may have different operations. As shown in FIG. 3B, once the active thread is displayed on the display 108, user may further interact with the thread and select additional participants form user's contact list (e.g. tapping on "+" button) or simply leave the chat session, which may be accomplished by simply tapping on a "Leave Chat' radial button. If during the chat session a user is reading the text/chat thread and it contains a cryptic text 106, the cryptic text 106 will be displayed. In some embodiments the decoded message 104 may also be displayed in conjunction with the cryptic text 106 as shown in FIG. 3C. In some embodiments, interactive application provides for voice communications to be converted into cryptic text 10 where a user may verbally speak the desired message that is converted to cryptic text 106 and transmitted (by converting to the cryptic text 106 to decoded message 104 that is transmitted as decoded message) to user contact. Upon receipt of the message by the recipient, if the recipient also has an interactive application 116A, the decoded message 104 that is received is verified for the presence of a indicator tag and the decoded message 104 upon interception is converted to the original cryptic text 106 for display.

In some embodiments, the message 104 is received at an inopportune time and the recipient may want to calendar incoming calls to remind recipients of calendared events, which may include returning a phone call. In some embodiments, the interactive module 118 allows the user in his/her interaction with the incoming electronic transmission to drag a icon 118 on the Message Center screen display to the code execution area 120 with an option to calendar a response to the incoming cryptic text 106 or plain message for varied times, e.g. an hour, 24 hours, a week, and the like.

Figure 4A:
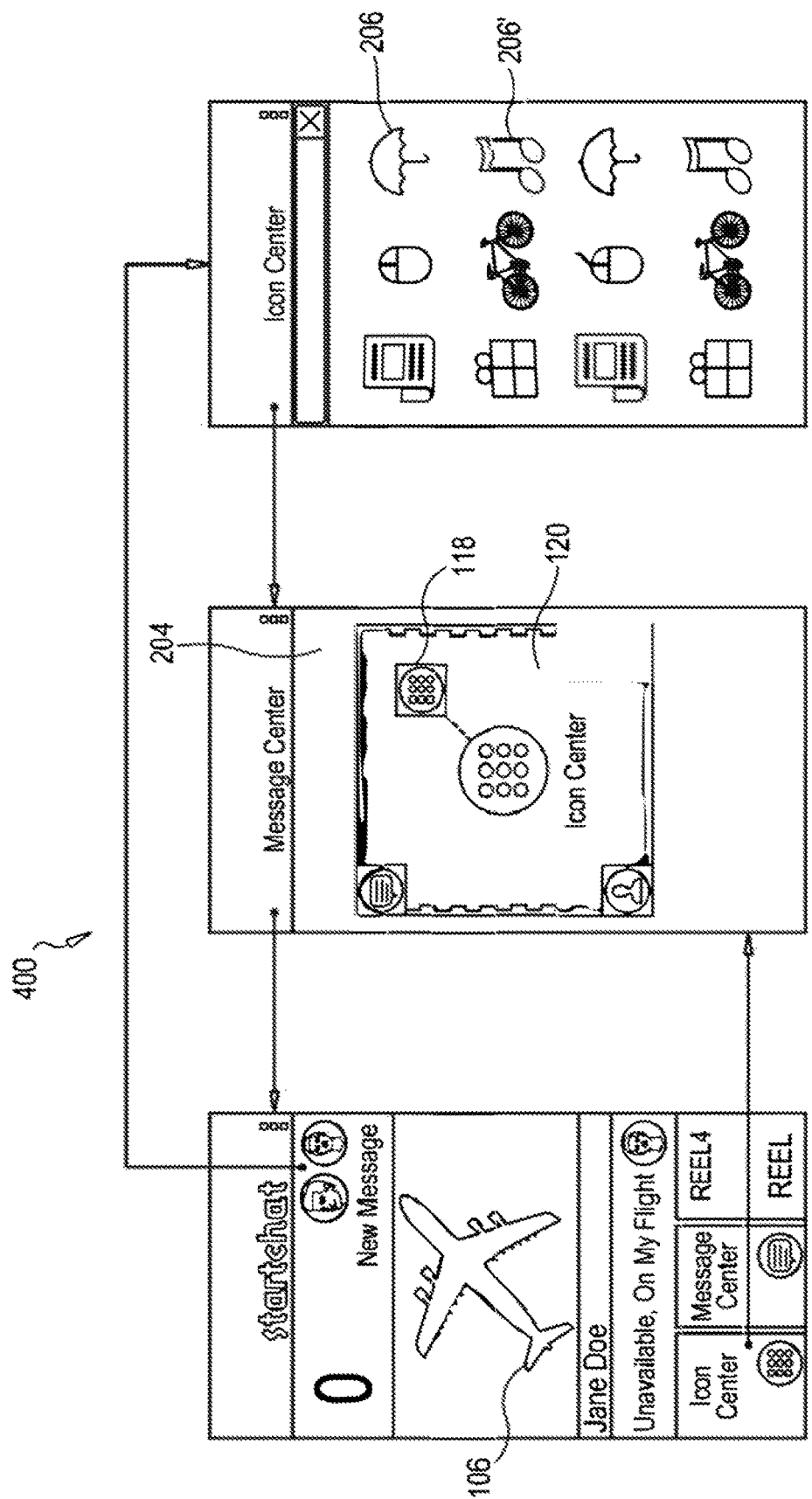
FIGS. 4A-4B show a system 200 in use according to an aspect of an embodiment of the present invention n.
Figure 4B:
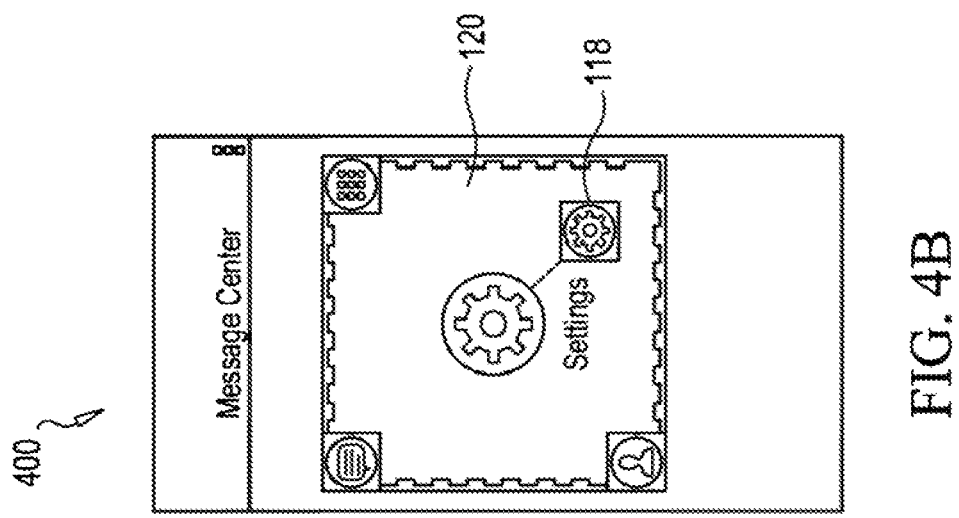

FIGS. 4A-4B show a system 400 in use according to an aspect of an embodiment of the present invention along with Message Center screen 204. Interactive application 116A allows users to select and customize aspects of the settings, e.g. the message icons 206, 206' that user wants to use in his/her communications. Interactive application 116A allows users to customize certain aspects of the displayed interactive application 116A, e.g. users may change for instance their Main screen avatar, add contacts and the like.

Figure 5A:
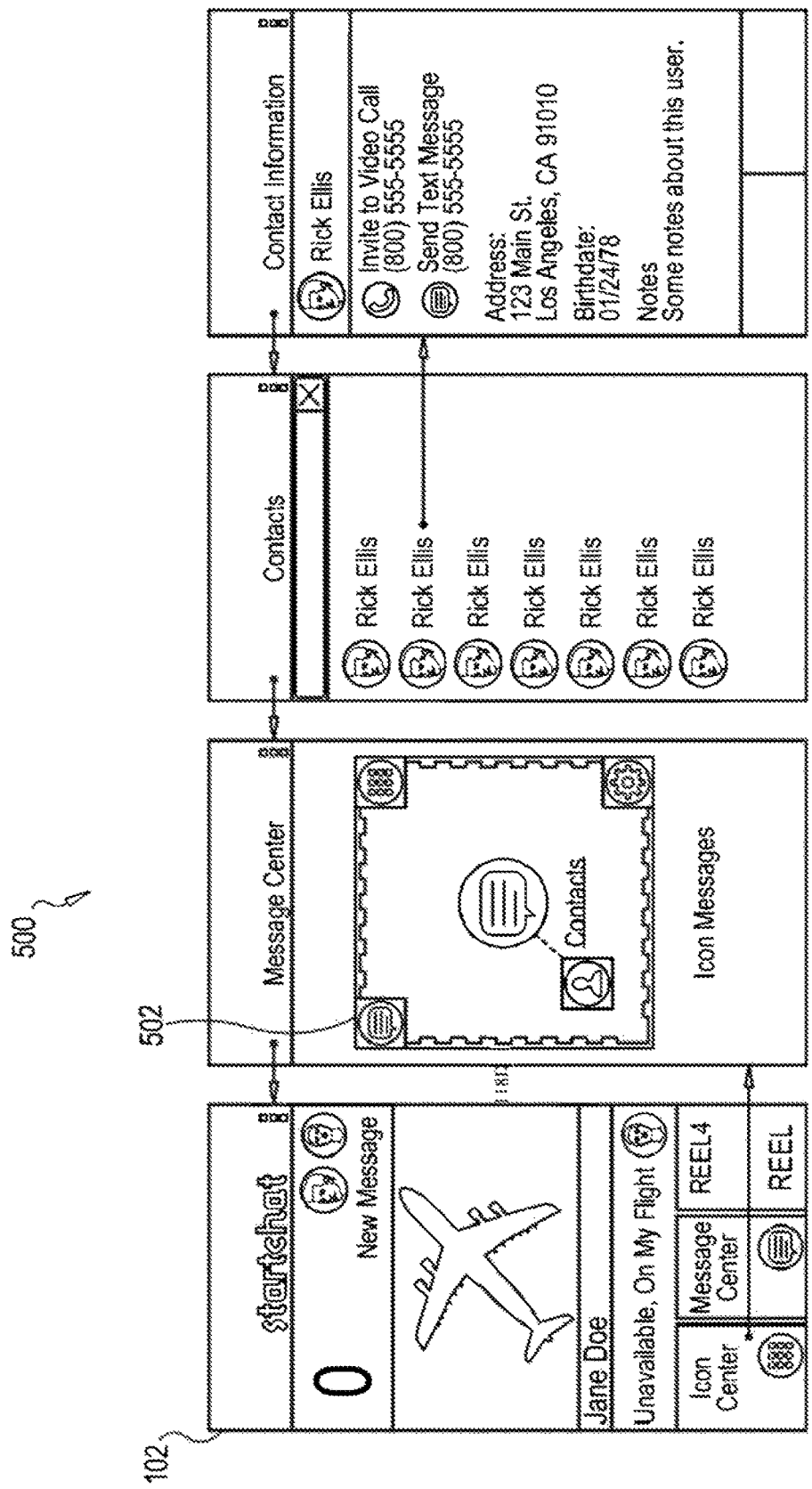
FIGS. 5A-5C show a system 200 in use according to an aspect of an embodiment of the present invention.
Figure 5B:
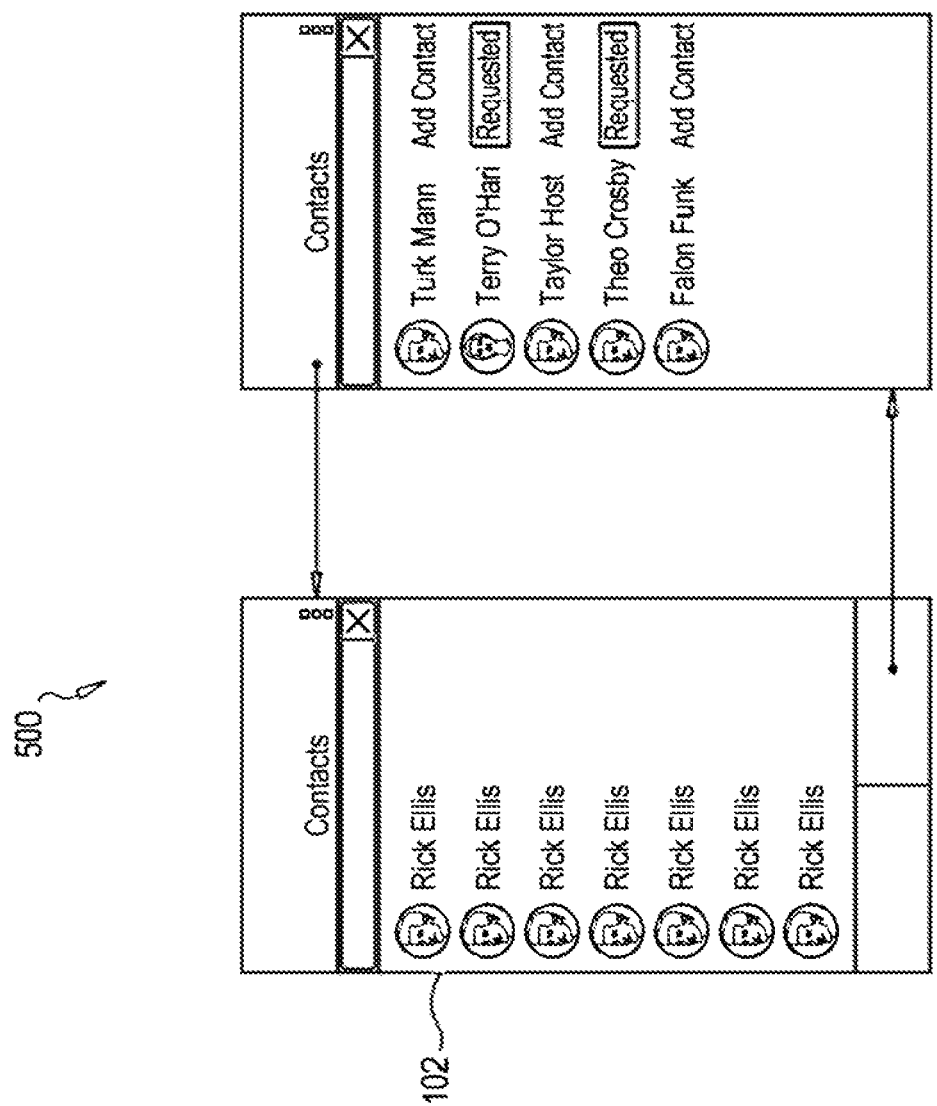
Figure 5C:
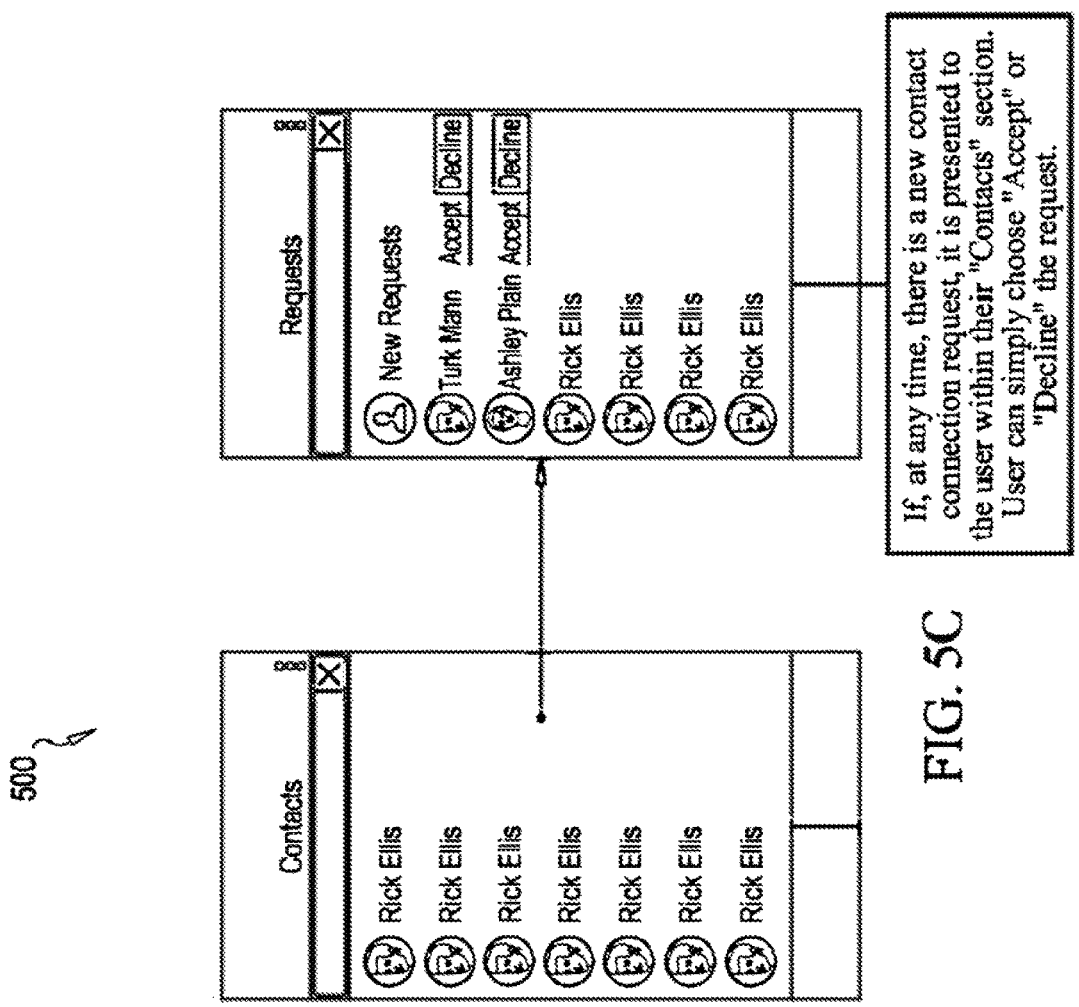

FIGS. 5A-5C show a system 300 in use according to an aspect of an embodiment of the present invention. Interactive application 116A, having been activated, operates with display 108 to display the Message Centre screen 204 from which user may select the appropriate icon 118D for interacting with his/her contacts, which directs user to another screen display wherein user may add contacts, search contacts, import contacts, view contact details, invite contacts to voice call or send messages (cryptic text 106 or plain SMS messages) to one/more contacts; accept or decline contact requests, and the like as is customary in the art.

In aspects of embodiments of the present invention, icons 118A, 118B, 118C, 118D may pulsate, blink or may be displayed in a color contrast or animated format to alert the user of the option to interact with the varied functionalities by exploring one or more of the interactive control commands embedded within icons 118A, 118B, 118C, 118D within a coded frame 502. In some embodiments, the control commands may be fully displayed, e.g. "ADD CONTACT" or "ACCEPT CONTACT". It is understood that all, any or each of icons 118A, 118B, 118C, 118D may be in any particular geometric shape or other configuration as it is representative of a control command embedded within each icon 118A, 118B, 118C, 118D within coded frame 502.

Figure 6:
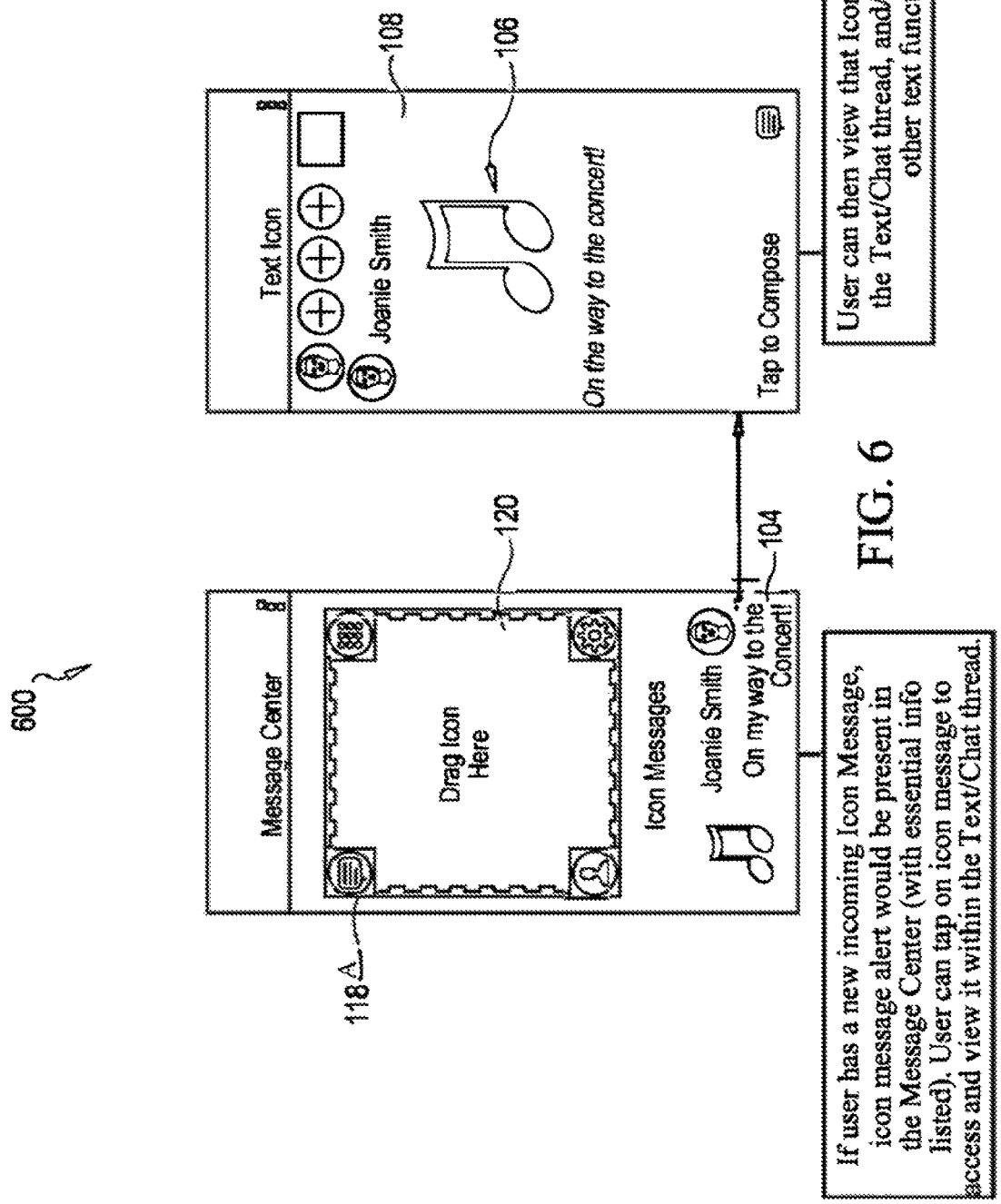
FIG. 6 shows an exemplary incoming telecommunications according to an embodiment of the systems of the invention.

FIG. 6 shows an exemplary incoming telecommunications according to an embodiment of the system 600 of the invention. Communication module 112 in communication with the mobile device 102, having enabled communication between all of the system 100 modules and between the mobile device 102 and a second and or a plurality of mobile device(s) 102, and having activated privacy controls for intercepting electronic transmissions, intercepts the incoming transmission for controlling the display of the electronic transmissions on the mobile device 10. The determination module 114 in communication with the at least one processor 110 determines the presence of an indicator tag for the incoming decoded message 104 identifying the decoded message as having a corresponding cryptic text 106 for the decoded message 104, converts the at least one decoded message 104 into cryptic text 106 for display on the mobile device's display 108.

The interactive module 116 in communication with the at least one processor 110 enables user interaction with the cryptic texts 114 via at least one icon 118, which are embedded with code and configured to enable different user interactions with the cryptic text 106. As shown, user may interact with the cryptic text 106, and wherein the embedded code may be executed by dragging the at least one icon 118A to a code execution area 120 of the display 108.

Figure 7:
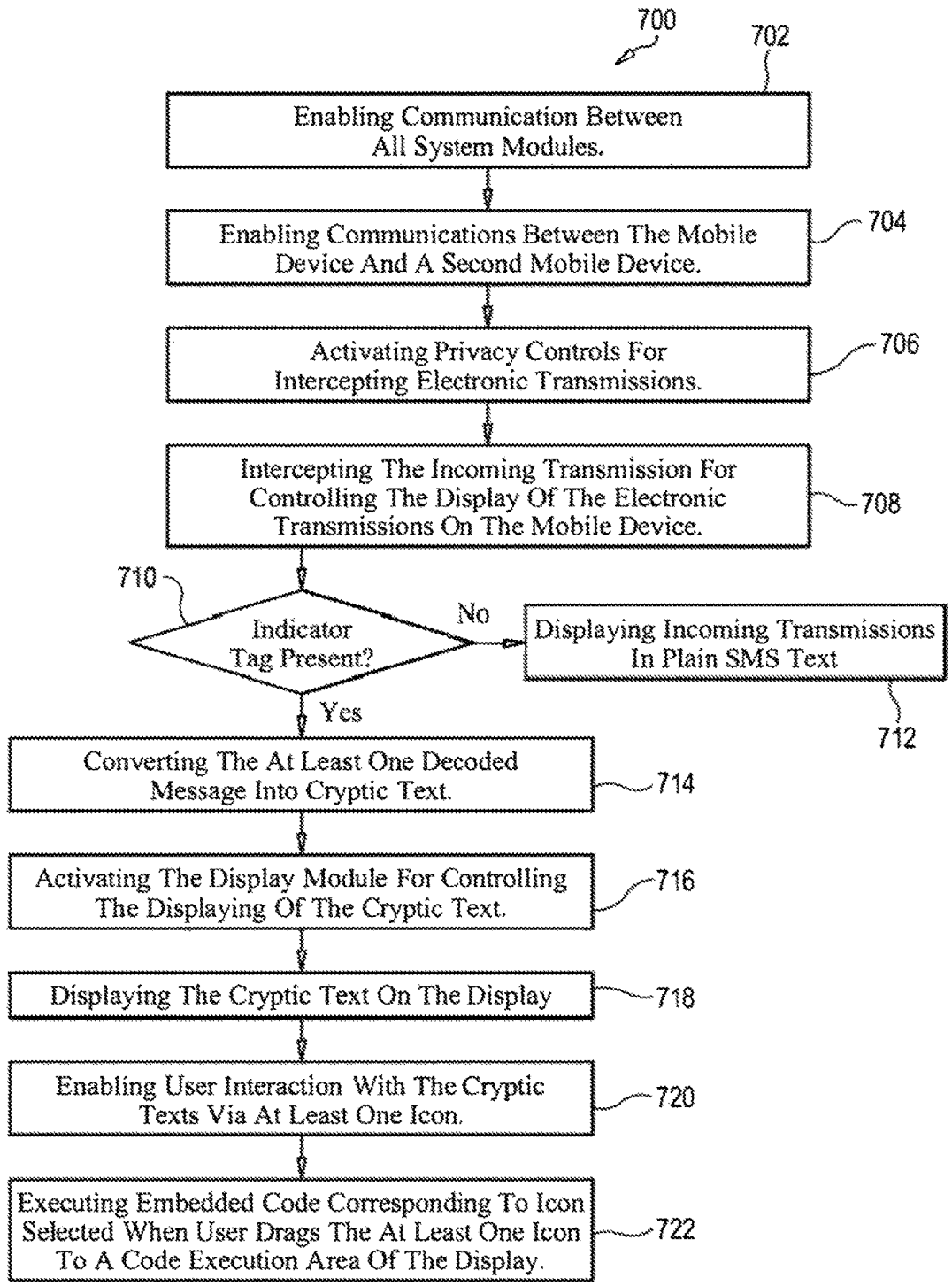
FIG. 7 is flowchart of block diagram of an exemplary method according to one embodiment of the invention.

In an aspect of an embodiment of the present invention a computer-implemented method/process 700 is described herein, which may implement any or all elements of system 600 as shown in FIG. 7, wherein the method 700 comprises: the communication module 112 in communication with the mobile device 102, enabling communication between all of the system 100 modules (step 702), enabling communication between the mobile device 102 and a second (and/or a plurality) of mobile device(s) 102 (step 704); and activating privacy controls for intercepting electronic transmissions (706). Communications module 112 is configured for intercepting the incoming transmission for controlling the display of the electronic transmissions on the mobile device 102 (708). The determination module 114 in communication with the at least one processor 110 determines the presence of an indicator tag for the incoming transmission (step 710) that is received as a decoded message 104 identifying the decoded message 104 as having a corresponding cryptic text 106 for the decoded message 104. If the incoming transmission does not have an indicator tag, then the incoming transmission will be displayed in plain SMS format (step 712). If however, the indicator tag is present, determination module 114 converts the at least one decoded message 104 into cryptic text 106 for display as cryptic text 106 (step 714) on the mobile device's display 108. The processor 110 activates the display module 123 for controlling the display 108 to display the cryptic text 106 (step 716) and responsive to the display module's 123 control, the cryptic text 106 is displayed on the display (718) for user interaction.

Once the cryptic text 106 is displayed, user may interact with the cryptic text 106 as described herein. Interactive module 116 in communication with the at least one processor 110 enables user interaction with the cryptic texts 114 via at least one icon 118 (step 720), which has embedded code and configured to enable different user interactions with the cryptic text 106. For example, interactive module 116 may execute embedded code corresponding to icon 118 selected when user drags the at least one icon 118 to a code execution area 120 of the display 108 (step 722).

Figure 8:
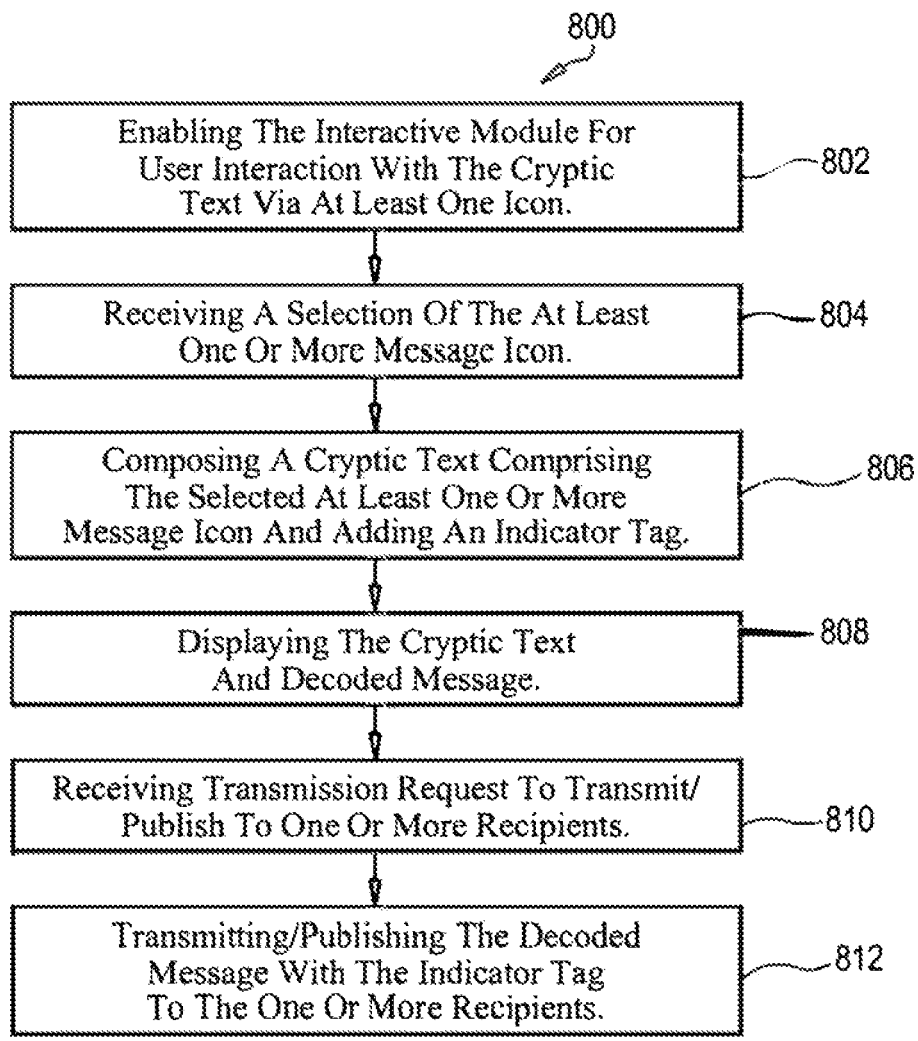
FIG. 8 is flowchart of block diagram of an exemplary method according to one embodiment of the invention.

FIG. 8 is flowchart of block diagram of an exemplary computer implemented method 800 according to one embodiment of the invention. Using the various systems 100-600 and components thereof described method 800 comprises enabling the interactive module 116 (via the interactive application 116A) for user interaction with the cryptic texts via at least one icon (802), which are embedded with code configured to enable different user interaction; receiving a selection of at least one or more message icon 206, 206' (step 804) for composing a cryptic text for transmission to one or more recipients. Method 800 further comprises composing a cryptic text 106 comprising of the selected at least one or more message icons 206, 206' that are displayed via the interactive module 116 and adding an indicator tag (step 806), by converting the selected at least one or more message icons 206, 206' into cryptic text 106; displaying the cryptic text 106 and the decoded message 104 on the display (step 808) where the user may selectively edit the message for transmission. Method 800 further comprises receiving a transmission request to transmit and/or publish the cryptic text 106 (to social network or text/chat thread) to one or a plurality of recipients (step 810) and transmitting/publishing the decoded message 104 with the indicator flag to one or more recipients (step 812).

Method 800 further comprises transmitting the at least one decoded message 104 to any one or more for the following: a second mobile device 102' or a social network, where either the decoded message 104, cryptic text 106 or a link reference to the decoded message 104 or cryptic text 104 may be displayed. If the receiving second, third, or a plurality of mobile communication devices 10' that are receiving the transmitted decoded message 104 also are configured with the interactive application 116A, method 800 further comprises receiving the transmitted at least one decoded message 104, converting the received decoded message 104 into cryptic text 136 for display in e.g. dormant mode on the recipient's mobile device's display 108; displaying the cryptic text 136 on the second mobile device's display 108' upon receipt of the decoded message 104.

Figure 9:
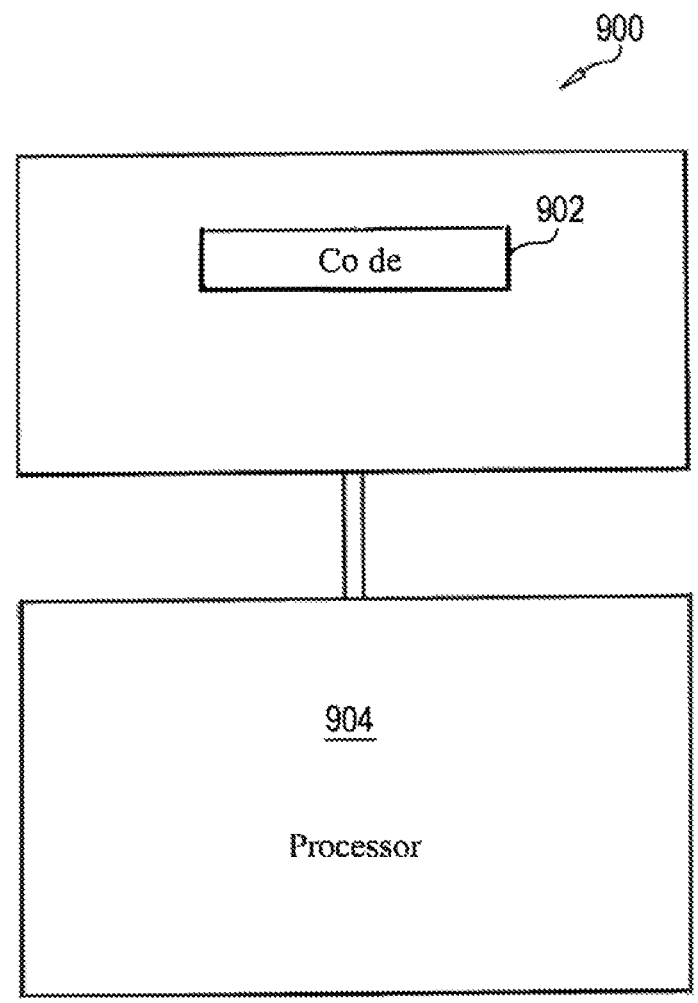
FIG. 9 illustrates an exemplary block diagram depicting a non-transitory computer readable medium according to an aspect of an embodiment of the present invention.

Referring now to FIG. 9, an exemplary block diagram depicting a non-transitory computer readable medium 900 according to an aspect of an embodiment of the present invention is shown.

An aspect of an embodiment of the invention contemplates computer program product, which may include a non-transitory computer readable/usable medium 900 having control logic stored thereon, where the control logic may include computer executable program code 902 readable and executable by a computer processor 904 that when executed causing the computer processor 904 to enable communications between one or more mobile device(s) 102 using interactive cryptic text 104 and for accessing one or more social networks, wherein the control logic may include computer readable program code 902 for performing any or all of the system process (steps or functions) discussed herein including but not limited to: launching an interactive application 116A configured for communicating between one or more mobile device(s) 102 using interactive cryptic text 104 and for accessing the social networks; enabling communication between a first mobile device 102 and a second (and/or a plurality of) mobile device(s) 102; activating privacy controls for intercepting electronic transmissions; intercepting the incoming and/or outgoing transmission for controlling the display of the electronic transmissions on the mobile device 102; determining the presence of an indicator tag for the incoming and/or outgoing transmission that is received as a decoded message 104 identifying the decoded message 104 as having a corresponding cryptic text 106 for the decoded message 104; converting the at least one decoded message 104 into cryptic text 106 for display as cryptic text 106 on the display 108; activating the display module 123 for controlling the display 108 to display the cryptic text 106 and displaying on the display for user interaction; enabling user interaction with the cryptic texts 114 via at least one icon wherein the embedded code may be executed by dragging the at least one icon 118 to a code execution area 120 of the display 108; executing embedded code corresponding to icon 118 selected when user drags the at least one icon 118 to a code execution area 120 of the display 108; transmitting the at least one decoded message 104 to any one or more for the following: a second mobile device 102 or a social network; converting the received decoded message 104 into cryptic text 106 for display in on a display 108 of a second mobile device 102; composing a cryptic text 106 comprising of the selected at least one or more message icons 206, 206' and adding an indicator tag; transmitting the decoded message 104 with the indicator flag to one or more recipients; calendaring a response to the cryptic text; receiving a selection of at least one or more message icon 206, 206' for composing a cryptic text 104 for transmission to one or more recipients; converting the selected at least one or more message icons 206, 206' into cryptic text 106; displaying the cryptic text 106 and the decoded message 104 on the display where the user may selectively edit the message for transmission; receiving a transmission request to transmit and/or publish the cryptic text 106 (to social network or text/chat thread) to one or a plurality of recipients; transmitting/publishing the decoded message 104 with the indicator flag to one or more recipients; and/or any or all the various functions otherwise described herein.

In some aspects of embodiments of the present invention, processor(s) 904 may be part of or integrated into a mobile device 102. In one aspect, computer executable program code 902 may be stored, in whole or in part, remotely, such as in a server or central station, or locally, such as in the mobile device 102.

Non-transitory computer readable medium 900 may comprise any type non-transitory computer readable medium, such as, but not limited to, a hard drive, a flash drive, a solid state drive, computer memory, a compact disc, a DVD, and the like. Computer readable medium 900 may comprise any of the various embodiments described herein, such as those described with reference to FIGS. 1 through 8.

In some embodiments, computer executable program code 902 may comprise the various embodiments of computer executable instructions described herein, such as those described above with reference to FIGS. 1-8. Computer executable program code 902 may be part of, used in, or be included in the various systems and methods described herein.

In aspect(s) of embodiment(s) of the present invention, a software program may be launched from a computer readable medium in computer-based systems to execute the functions defined in the present invention. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Hardware and Operating Environment

This section provides an overview of example hardware and the operating environments in conjunction with which embodiments of the inventive subject matter can be implemented.

A software program may be launched from a computer readable medium in a computer-based system 100 to execute the functions defined in the software program. Various programming languages may be employed to create software programs designed to implement and perform the system and methods 100-500 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 10 below.

Figure 10:
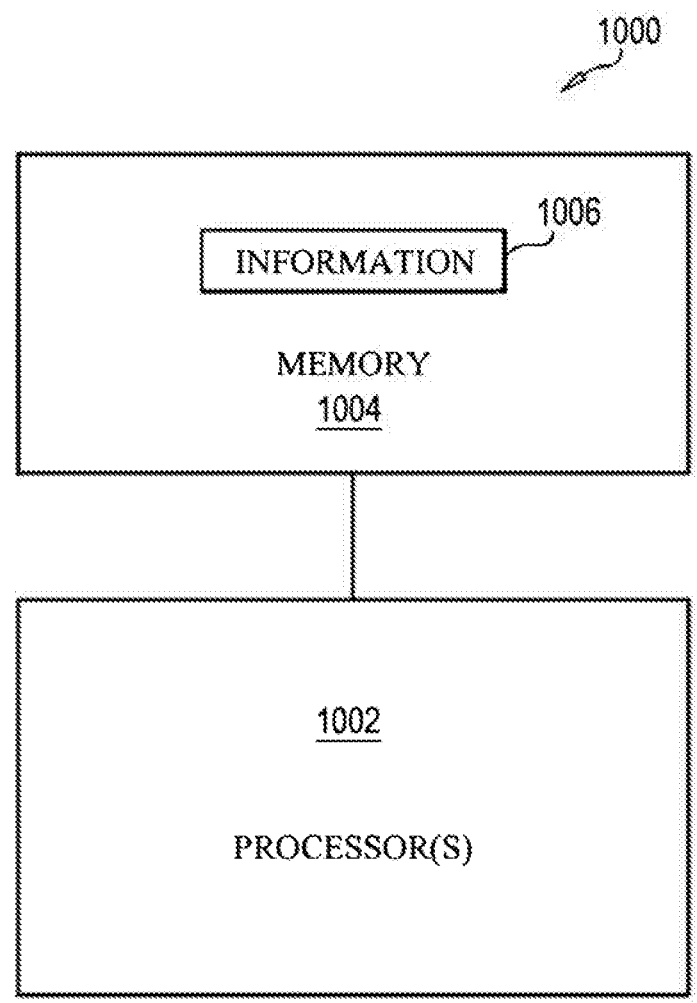
FIG. 10 is a block diagram representing an apparatus according to various embodiments.

FIG. 10 is a block diagram representing an apparatus 1000 according to various embodiments. Such embodiments may comprise a computer, a memory system, a magnetic or optical disk, some other storage device, or any type of electronic device or system. The apparatus 1000 may include one or more processor(s) 1004 coupled to a machine-accessible medium such as a memory 1002 (e.g., a memory including electrical, optical, or electromagnetic elements). The medium may contain associated information 1004 (e.g., computer program instructions, data, or both) which, when accessed, results in a machine (e.g., the processor(s) 1004) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising of:
   a first mobile device configured to display messages on a display of the mobile device;
   at least one processor in communication with the mobile device;
   a communication module in communication with the mobile device, wherein the communication module is configured for:
   enabling communication between all of the system modules;
   enabling communication between the mobile device and a second mobile device; and
   activating privacy controls for intercepting electronic transmissions for controlling the display of the electronic transmissions on the mobile device;
   a determination module in communication with the at least one processor, wherein the determination module is configured for determining presence of an indicator tag for incoming and/or outgoing decoded messages identifying messages for which there is a corresponding cryptic text; and for converting the at least one decoded message into cryptic text for displaying on the display; and
   an interactive module in communication with the at least one processor wherein the interactive module is configured to enable user interaction with the cryptic texts via at least one icon, which are embedded with code configured to enable different user interactions with the cryptic text, wherein the embedded code may be executed by dragging the at least one icon to a code execution area of the display.

2. The system of claim 1 further comprising a memory module in communication with the at least one processor.

3. The system of claim 1, wherein the communications module is further configured for transmitting the at least one decoded message to any one or more for the following: a second mobile device or a social network.

4. The system of claim 1, wherein the determination module is further configured for converting the received decoded message into cryptic text for display in on a display of a second mobile device.

5. The system of claim 1, further comprising composing a cryptic text comprising of the selected at least one or more message icons and adding an indicator tag.

6. The system of claim 1, further comprising transmitting the decoded message 104 with the indicator flag to one or more recipients.

7. The system of claim 1, further comprising calendaring a response to the cryptic text.

8. The system of claim 1, further comprising converting the selected at least one or more message icons into cryptic text.

9. The system of claim 1, further comprising receiving a transmission request to transmit and/or publish the cryptic text to one or a plurality of recipients.

10. A computer implemented method comprising of:
    enabling communication by a communication module between all system modules and enabling communication between a mobile device and a second mobile device;
    activating privacy controls for a first mobile device that includes a computer processor for intercepting both electronic transmissions for controlling the display of electronic transmissions;
    determining by a determination module in communication with the at least one processor, presence of an indicator tag for incoming and/or outgoing decoded messages identifying messages for which there is a corresponding cryptic text and for converting the at least one decoded message into cryptic text for displaying on a display;
    enabling by an interactive module user interaction with the cryptic text via at least one icon, which are embedded with code configured to enable different user interactions with the cryptic text, wherein the embedded code may be executed by dragging the at least one icon to a code execution area of the display.

11. The computer implemented method of claim 10, further comprising transmitting the at least one decoded message to any one or more for the following: a second mobile device or a social network.

12. The computer implemented method of claim 10, further configured for converting the received decoded message into cryptic text for display in on a display of a second mobile device.

13. The computer implemented method of claim 10, further comprising composing a cryptic text comprising of the selected at least one or more message icons and adding an indicator tag.

14. The computer implemented method of claim 10, further comprising transmitting the decoded message 104 with the indicator flag to one or more recipients.

15. The computer implemented method of claim 10, further comprising calendaring a response to the cryptic text.

16. The computer implemented method of claim 10, further comprising converting the selected at least one or more message icons into cryptic text.

17. The computer implemented method of claim 10, further comprising computer readable program code for receiving a transmission request to transmit and/or publish the cryptic text to one or a plurality of recipients.

18. A computer program product comprising a non-transitory computer usable medium having control logic stored therein for causing a computer processor to enable communications between one or more mobile device(s) using interactive cryptic text and for accessing social network, said control logic comprising:
- computer readable program code for launching an interaction application configured for communicating between one or more mobile devices using interactive cryptic text and for accessing the social network;
- computer readable program code for enabling communication between a first mobile device and a second mobile device;
- computer readable program code for activating privacy controls for intercepting electronic transmissions;
- computer readable program code for intercepting the incoming transmission for controlling the display of the electronic transmissions on the mobile device
- computer readable program code for determining presence of an indicator tag for incoming and/or outgoing decoded messages identifying messages for which there is a corresponding cryptic text and for converting the at least one decoded message into cryptic text for displaying on a display; and
- computer readable program code for enabling user interaction with the cryptic texts via at least one icon, which are embedded with code configured to enable different user interactions with the cryptic text, wherein the embedded code may be executed by dragging the at least one icon to a code execution area of the display.

19. The computer program product of claim 18 further comprising computer readable program code for transmitting the at least one decoded message to any one or more for the following: a second mobile device or a social network.

20. The computer program product of claim 18 further comprising computer readable program code for converting the received decoded message into cryptic text for display in on a display of a second mobile device.

21. The computer program product of claim 18 further comprising computer readable program code for composing a cryptic text comprising of the selected at least one or more message icons and adding an indicator tag.

22. The computer program product of claim 18 further comprising computer readable program code for transmitting the decoded message 104 with the indicator flag to one or more recipients.

23. The computer program product of claim 18 further comprising computer readable program code for calendaring a response to the cryptic text.

24. The computer program product of claim 18 further comprising computer readable program code for converting the selected at least one or more message icons into cryptic text.

25. The computer program product of claim 18 further comprising computer readable program code for receiving a transmission request to transmit and/or publish the cryptic text to one or a plurality of recipients.

* * * * *